United States Patent
Ajimoto et al.

(10) Patent No.: US 8,666,617 B2
(45) Date of Patent: Mar. 4, 2014

(54) GEAR SHIFT CONTROL UNIT FOR AUTOMATIC TRANSMISSION

(75) Inventors: Keisuke Ajimoto, Tokyo (JP); Shinya Yasunaga, Tokyo (JP); Masayuki Nishida, Tokyo (JP); Hiroki Tanaka, Tokyo (JP); Takahito Morishita, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 191 days.

(21) Appl. No.: 13/305,697

(22) Filed: Nov. 28, 2011

(65) Prior Publication Data

US 2012/0150396 A1   Jun. 14, 2012

(30) Foreign Application Priority Data

Dec. 8, 2010   (JP) .................................. 2010-273957

(51) Int. Cl.
*B60W 50/12*   (2012.01)
*B60W 10/02*   (2006.01)

(52) U.S. Cl.
USPC .............................................. 701/52; 701/56

(58) Field of Classification Search
USPC ................. 701/51, 52, 53, 54, 55, 56, 67, 68
See application file for complete search history.

(56) References Cited

U.S. PATENT DOCUMENTS

| | | | |
|---|---|---|---|
| 5,890,991 A * | 4/1999 | Sakakiyama | 477/48 |
| 6,030,315 A * | 2/2000 | Bellinger | 477/121 |
| 6,085,139 A | 7/2000 | Nakauchi et al. | |
| 2004/0266583 A1 * | 12/2004 | Henneken et al. | 477/34 |
| 2009/0240406 A1 * | 9/2009 | Fukushima et al. | 701/54 |
| 2010/0076652 A1 * | 3/2010 | Hyodo et al. | 701/50 |
| 2010/0179025 A1 * | 7/2010 | Hyakutake | 477/125 |
| 2010/0318267 A1 * | 12/2010 | Murata et al. | 701/52 |
| 2011/0130928 A1 * | 6/2011 | Matsunaga et al. | 701/52 |

FOREIGN PATENT DOCUMENTS

| | | |
|---|---|---|
| JP | 10-141485 A | 5/1998 |
| JP | 2006-097789 A | 4/2006 |
| JP | 2006-97789 A | 4/2006 |

\* cited by examiner

*Primary Examiner* — Jason Holloway

(74) *Attorney, Agent, or Firm* — McGinn IP Law Group, PLLC

(57) ABSTRACT

In a gear shift control unit for an automatic transmission, when an up-shift switch or a down-shift switch of a paddle shift switch is turned ON, a gear shift mode is set to a temporary manual shift mode, and a target transmission gear stage is shifted up or shifted down. Subsequently, a manual assist control is executed. In the manual assist control, an acceleration is calculated from a temporal differentiation of a vehicle speed. After it is detected that the acceleration is larger than or equal to an acceleration determination threshold, an accelerator pedal return acceleration is calculated from a double temporal differentiation of an accelerator opening degree. When the accelerator pedal return acceleration is smaller than or equal to another acceleration determination threshold, the current target transmission gear stage is automatically shifted down.

3 Claims, 6 Drawing Sheets

GEAR SHIFT CONTROL UNIT FOR AUTOMATIC TRANSMISSION

CROSS-REFERENCE TO RELATED APPLICATIONS

The present application claims priority from Japanese Patent Application No. 2010-273957 filed on Dec. 8, 2010, the entire contents of which are hereby incorporated by reference.

BACKGROUND OF THE INVENTION

1. Field of the Invention

The present invention relates to a gear shift control unit for an automatic transmission with which a temporary manual shift mode can be selected while driving in an automatic shift mode.

2. Description of the Related Art

There has been known an automatic transmission provided with a continuously variable transmission (CVT), a multi-stage transmission such as a planetary pinion mechanism, or the like in which a transmission gear ratio (transmission gear stage) is automatically set according to a driving state by setting a select lever in a D (drive) range and a manual shift mode where a driver can select any transmission gear stage by selecting the select lever in an M (manual shift) range, as is the case with a manual transmission (MT) vehicle.

There has also been known an automatic transmission provided with a temporary manual shift mode in which when a driver operates a down-shift switch or an up-shift switch provided separately in addition to the select lever during traveling in the automatic shift mode, the transmission gear stage is temporarily shifted down or up.

For example, Japanese Unexamined Patent Application Publication No. 2006-97789 discloses a technology in which when a down-shift switch or an up-shift switch provided in a front portion of a back face of a steering wheel is operated during driving in the automatic shift mode where the select lever is set in the D range, a gear shift mode is temporarily switched to the manual shift mode, and also the transmission gear stage is shifted down or up.

Furthermore, Japanese Unexamined Patent Application Publication No. 2006-97789 discloses a technology in which when a predetermined cancellation condition is satisfied, the gear shift mode is automatically returned from the temporary manual shift mode to the automatic shift mode.

In general, accelerated driving by depressing an accelerator pedal is set as a cancellation condition of the temporary manual shift mode as disclosed in the above-mentioned Japanese Unexamined Patent Application Publication No. 2006-97789. When the temporary manual shift mode is automatically canceled by accelerated driving to be returned to the automatic shift mode, accelerated driving is detected and the transmission gear stage is once shifted down. However, if the accelerator pedal is returned to change to constant speed driving, the transmission gear stage is shifted up. Therefore, even if the accelerator pedal is released after accelerated driving to perform decelerated driving, the gear shift mode has been switched to the automatic shift mode, and thus sufficient engine braking the driver expects cannot be obtained.

In the case of traveling on a curved road, for example, when a vehicle enters the curved road, down-shifting is performed and an engine brake is activated for deceleration, and, when the vehicle leaves the curved road, the accelerator pedal is depressed for acceleration. When the vehicle enters the curved road, load affected on a vehicle body is moved from a rear wheel side to a front wheel side through deceleration, which enhances cornering power of the front wheels, and the load affected on the rear wheels escapes, which decreases cornering power of the rear wheels, whereby maneuverability is improved. On the other hand, when the vehicle leaves the curved road through acceleration, the load affected on the vehicle body is moved to the rear wheel side, whereby the vehicle can run stably.

When down-shifting is performed in the temporary manual shift mode to enter a curved road, and then acceleration is performed when the vehicle leaves the curved road, the gear shift mode is automatically switched to the automatic shift mode. Therefore, when the vehicle enters a next curved road, the down-shift switch needs to be turned on again. Thus, troublesome driving operations are required.

Suppose that a vehicle travels on a road where curves continuously appear. If a next curved section cannot be predicted while the vehicle is traveling on a first curved section, and a curvature of the next curved section is larger than that of the first curved section (sharp curve), the driver leaves the first curved section through acceleration, and then try to turn the down-shift switch ON again and activate the engine brake upon entering the next curved section. Since the driver performs steering and braking operations at the same time, the down-shift switch cannot be operated, and thus the driver strongly depresses a foot brake so that the vehicle enters the next curved section in a deceleration state. Since the gear shift mode has been switched to the automatic shift mode, sufficient engine braking cannot be obtained, and excellent driving stability described above cannot be obtained.

Furthermore, even when the accelerator pedal is depressed to accelerate for leaving the curved section, it is determined that accelerated driving is performed since the transmission gear stage has been shifted up, and thus a response delay is generated until down-shifting is performed. During the delay period, the driver may have a feeling of torque insufficiency.

SUMMARY OF THE INVENTION

The present invention has been made in view of the above, and it is an object of the present invention to provide a gear shift control unit for an automatic transmission that improves convenience for a driver. Specifically, if a driver has difficulty in performing a down-shifting operation during driving after a gear shift mode has been switched to a temporary manual shift mode, the gear shift control unit for an automatic transmission automatically appropriately changes a transmission gear stage in a temporary manual shift mode without switching the gear shift mode to an automatic shift mode.

According to an aspect of the present invention, a gear shift control unit for an automatic transmission includes an automatic shift mode and a temporary manual shift mode. In the automatic shift mode, a gear shift control is executed on the basis of a traveling state of a vehicle. In the temporary manual shift mode, when the automatic shift mode is executed, the gear shift control is temporarily executed with a manual shift operation unit in response to an operation of a driver until a predetermined cancellation condition is satisfied, and the automatic shift mode is automatically returned when the predetermined cancellation condition is satisfied. The gear shift control apparatus for an automatic transmission also includes a vehicle traveling state determination unit that determines a traveling state of the vehicle. The temporary manual shift mode includes a manual assist control unit that automatically shifts down a transmission gear stage when the vehicle traveling state determination unit determines a predetermined traveling state on the basis of a parameter for detecting the traveling state of the vehicle.

According to the present invention, if, after the gear shift mode has been switched to the manual shift mode, it is determined that the driver has difficulty in performing a gear change in the manual shift mode and a deceleration request is made, the transmission gear stage is automatically shifted down by the manual assist control unit, whereby not only convenience for the driver is improved, but also excellent maneuverability can be attained.

DESCRIPTION OF THE PREFERRED EMBODIMENTS

Figure 1:
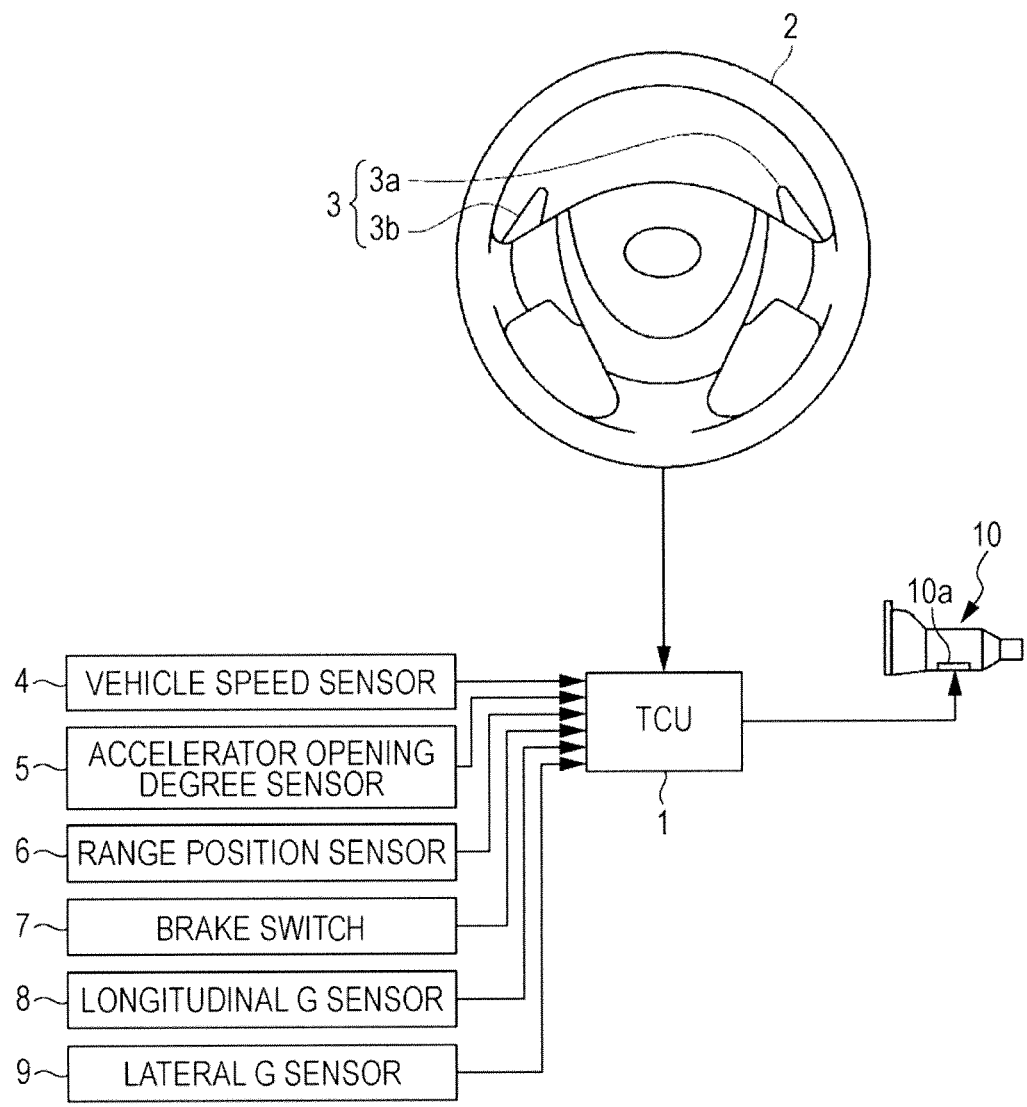
FIG. 1 is a schematic configuration diagram of a gear shift control unit.

Hereinafter, an embodiment of the present invention will be described with reference to the drawings. In FIG. 1, a gear shift control unit (TCU) 1 mainly includes an unillustrated known micro computer provided with a CPU, a ROM, a RAM, a non-volatile memory such as an EEPROM, and an input interface and an output interface. The CPU executes various controls according to control programs stored in the ROM. Furthermore, fixed data such as a later-described down-shift table is stored in the ROM.

A paddle switch-shaped temporary manual shift switch (hereinafter referred to as "paddle shift switch") 3 is disposed in a front portion of a back face side of a steering wheel 2. The paddle shift switch includes an up-shift switch 3a and a down-shift switch 3b functioning as a manual shift operation unit. These switches are connected on an input-interface side of the TCU 1. sensors and switches that detect parameters necessary for the gear shift control are also connected to the input-interface side of the TCU 1, the sensors and switches including a vehicle speed sensor 4 that detects a vehicle speed V, an accelerator opening degree sensor 5 that detects an accelerator opening degree θacc indicating a depression amount of an unillustrated accelerator pedal, a range position sensor (inhibiter switch) 6 functioning as a position detection unit that detects a range position where an unillustrated select lever is set (P (parking), R (reverse), D (drive), M (manual mode), and the like), a brake switch 7 that detects a depression of a brake pedal for operating a foot brake and outputs an ON signal, a longitudinal acceleration (longitudinal G) sensor 8 that detects a longitudinal acceleration applied in the front-rear direction of the vehicle, a lateral acceleration (lateral G) sensor 9 that detects an acceleration applied in the lateral direction of the vehicle.

A control valve 10a provided to an automatic transmission 10 is connected to an output-interface side of the TCU 1. The control valve 10a controls the gear shift of the automatic transmission 10 according to a gear shift instruction signal from the TCU 1. If the automatic transmission 10 is a multi-stage transmission apparatus using a planetary pinion apparatus, the control valve 10a controls the gear shift by fastening respective rotary elements of the planetary pinion apparatus, or selectively supplying a hydraulic pressure selectively supplied to fastening elements such as a friction brake and a friction clutch that couple the rotary elements. If the automatic transmission 10 is a CVT, according to a gear change instruction indicating a target transmission gear ratio from the TCU 1, the control valve 10a controls the hydraulic pressures with respect to primary rotary elements on an engine side and secondary rotary elements on a driving wheel side and sets the transmission gear ratio to a target transmission gear ratio.

The TCU 1 examines the position in which the select lever is set on the basis of a range position signal output from the range position sensor 6. Then, if the select lever is set in the D range, the TCU 1 refers to an unillustrated gear shift map, using the vehicle speed V detected by the vehicle speed sensor 4 and the accelerator opening degree θacc detected by the accelerator opening degree sensor 5 as parameters. If the automatic transmission 10 is a CVT, a transmission gear ratio is, and, if the automatic transmission 10 is a multistage transmission, a transmission gear stage is set.

The TCU 1 also examines whether or not the up-shift switch 3a or the down-shift switch 3b that are part of the paddle shift switch 3 is turned ON, in other words, whether or not an up-shift instruction is output from the up-shift switch 3a or whether or not a down-shift instruction is output from the down-shift switch 3b. If either one of the shift switches 3a and 3b turned ON (if a shift instruction is output), the gear shift mode is switched to a temporary manual shift mode, and also the down-shift control or the up-shift control is performed on the transmission gear stage of the automatic transmission 10, corresponding to either of the shift switch 3a and 3b which outputs the ON signal.

Specifically, the gear shift control executed by the TCU 1 is performed according to flow charts illustrated in FIGS. 2 to 5.

Figure 2:
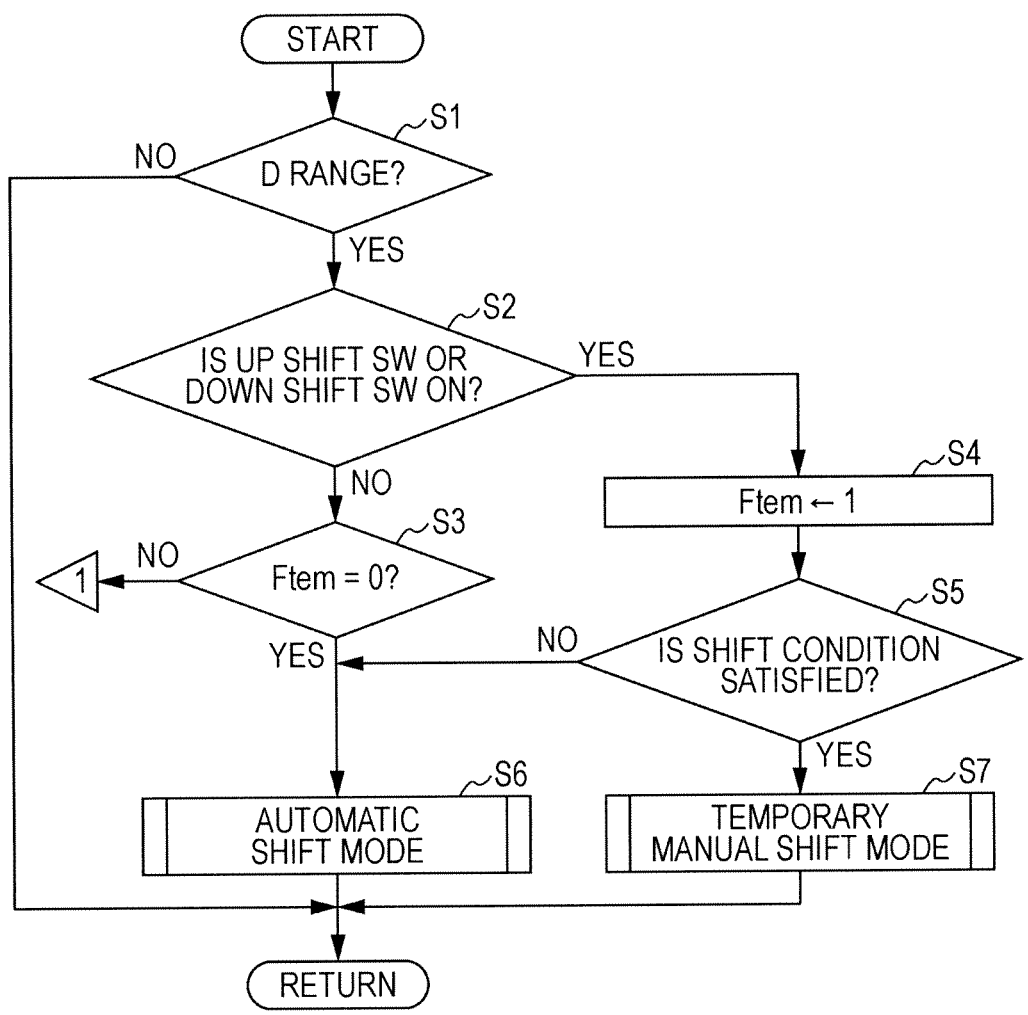
FIG. 2 is a flow chart illustrating a gear shift control routine.

When an unillustrated ignition switch is turned ON, a gear shift control routine illustrated in FIG. 2 is executed. Firstly, in step S1, it is examined whether or not the select lever is set in the D range on the basis of a signal from the range position sensor 6. If the select lever is not set in the D range, the process stands by until the select lever is set in the D range. If the select lever is set in the D range, the flow proceeds to step S2.

When the flow proceeds to step S2, it is examined whether or not the up-shift switch 3a or the down-shift switch 3b of the paddle shift switch 3 is turned ON. When neither of the shift switches 3a and 3b is not turned ON, the flow proceeds to step S3 where it is examined whether or not a temporary mode determination flag Ftem is cleared. When the temporary mode determination flag Ftem is cleared (Ftem=0), the flow proceeds to step S6 where a normal automatic shift mode is executed. Then the routine is exited. In the automatic shift mode, a target transmission gear stage is set on the basis of parameters indicating the traveling state of the vehicle (for example, the accelerator opening degree θacc and the vehicle speed V), and the up-shift control or the down-shift control is performed so that a current transmission gear stage reaches the target transmission gear stage. Since a control executed in the automatic shift mode is similar to one used in the related art, a description thereof is omitted herein.

When the temporary mode determination flag Ftem is set (Ftem=1), it is determined that either one of the shift switches 3a and 3b was once turned ON upon a previous or older execution of the routine, and that the temporary manual shift mode is continuing. Accordingly, the flow skips to step S12 of a temporary manual shift mode sub-routine illustrated in FIG.

3, which will be described later. An initial value of the temporary mode determination flag Ftem is 0. The value is set in step S4, which will be described later, and cleared in step S16 of FIG. 3.

On the other hand, when it is determined in step S2 that either one of the shift switches 3a and 3b is turned ON, the flow proceeds to step S4 where the temporary mode determination flag Ftem is set (Ftem 1), and then proceeds to step S5.

When the flow proceeds to step S5, it is examined whether or not a shift condition is satisfied. This shift condition is used to determine whether or not it is possible to shift the gear in the up-shift direction or the down-shift direction from the current transmission gear stage (the transmission gear ratio for the CVT) when the up-shift switch 3a or the down-shift switch 3b is turned ON. More specifically, by referring to the gear shift map with the vehicle speed and the throttle opening degree being used as parameters, it is examined whether or not the transmission gear stage (the transmission gear ratio in for the CVT) after up-shifting or down-shifting falls in a gear shift changeable range.

If it is determined that the gear shift can be changed (the transmission gear stage falls in the gear shift changeable range), the flow proceeds to step S7 where the temporary manual shift mode is executed. Then the routine is exited. If it is determined that the gear shift cannot be changed (the transmission gear stage does not fall in the gear shift changeable range), on the other hand, the flow proceeds to step S6, and the automatic shift mode is continued.

Figure 3:
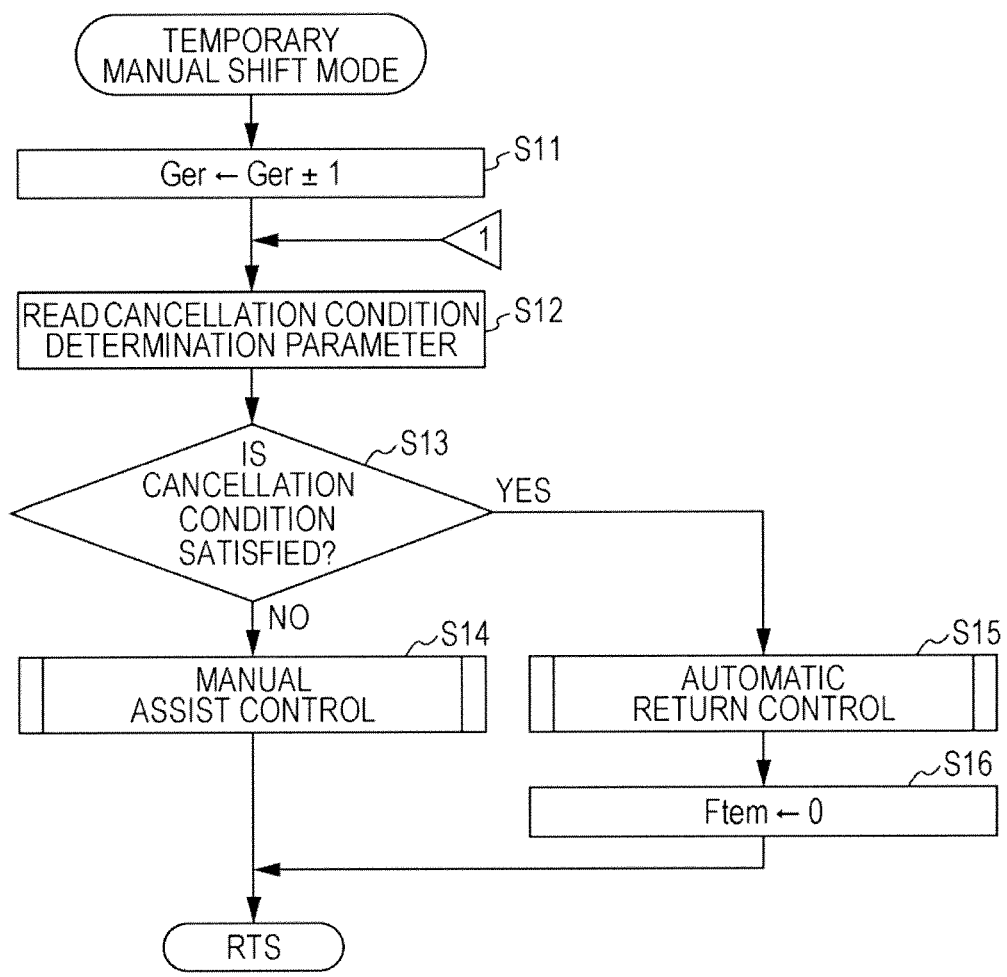
FIG. 3 is a flow chart illustrating a temporary manual shift mode sub-routine.

The above-mentioned temporary manual shift mode executed in step S7 is processed according to the temporary manual shift mode sub-routine illustrated in FIG. 3.

In this sub-routine, firstly, in step S11, based on the above-mentioned ON signal from the up-shift switch 3a or the down-shift switch 3b, a current target transmission gear stage Ger is shifted up or shifted down by one speed stage (Ger←Ger±1). Then the flow proceeds to step S12.

When the flow proceeds to step S12, a parameter for determining a cancellation condition for the temporary manual shift mode is read. Examples of the cancellation condition determination parameter include the vehicle speed V, the ON signal from the paddle shift switch 3, the accelerator opening degree θacc.

Subsequently, the flow proceeds to step S13 where it is examined whether or not the cancellation condition for the temporary manual shift mode is satisfied. Items of the cancellation condition for the temporary manual shift mode are exemplified as follows.

1) The ON signal from the up-shift switch 3a or the down-shift switch 3b of the paddle shift switch 3 is not output for a predetermined period of minutes (for example, 2 to 3 [min]) or longer (automatic cancelation).

2) The accelerator opening degree is not significantly changed for a predetermined period of minutes (for example, 2 to 3 [min]) or longer (automatic cancelation).

3) The vehicle speed is lower than or equal to a stop determination vehicle speed (automatic cancelation).

4) The ON signal from the un-shift switch 3a or the down-shift switch 3b of the paddle shift switch 3 is continuously output for a predetermined period of seconds (for example, 2 to 5 [sec]) or longer (manual cancelation).

If none of the above-mentioned 1) to 4) is not accomplished, it is determined that the cancellation condition is not satisfied, and then the flow proceeds to step S14. If at least one item of the determination condition is accomplished, on the other hand, it is determined that the cancellation condition for the temporary manual shift mode is satisfied, and then the flow branches to step S15. In the present embodiment, even if the accelerator pedal is depressed in the temporary manual shift mode to perform accelerated driving, the temporary manual shift mode is continuously executed since the depression of the accelerator pedal does not correspond to the above-mentioned cancellation condition items. As a result, for example, when the vehicle travels on a road where curves continuously appear by repeatedly performing accelerated driving and decelerated driving, the gear shift mode is not automatically switched to the automatic shift mode, and thus that the driver feels less discomfort while the driver is driving the vehicle.

Then the flow proceeds to step S14 where the manual assist control is executed. Then the routine is exited. The process performed in step S14 corresponds to a manual assist control unit of the present invention.

On the other hand, when the flow proceeds to step S15, an automatic return control process is executed. The flow proceeds to step S16 where the temporary mode determination flag Ftem is cleared (Ftem←0). Then the routine is exited. In the automatic return control process executed in step S15, the target transmission gear stage (the target transmission gear ratio for the CVT) for the transit to the automatic shift mode is set on the basis of the throttle opening degree θ and the vehicle speed V by referring to a unillustrated gear shift schedule map or by calculation. Then, the current transmission gear stage (the transmission gear ratio for the CVT) is compared with the target transmission gear stage (the target transmission gear ratio for the CVT), and the current transmission gear stage (current transmission gear ratio) is gradually shifted to the target transmission gear stage (target transmission gear ratio) to complete the automatic return process.

Figure 4:
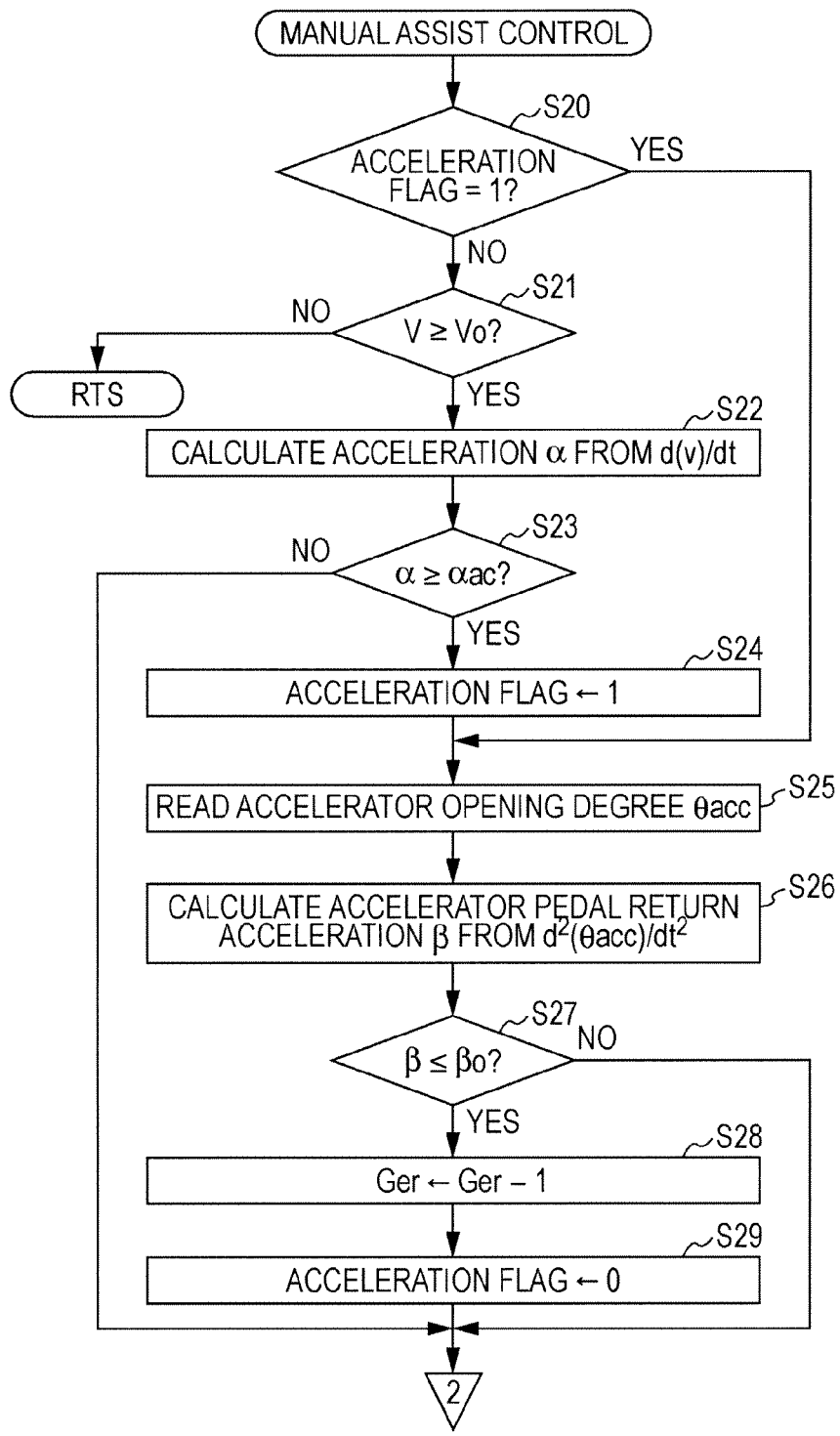
FIG. 4 is a flow chart illustrating a manual assist control sub-routine (part 1)
Figure 5:
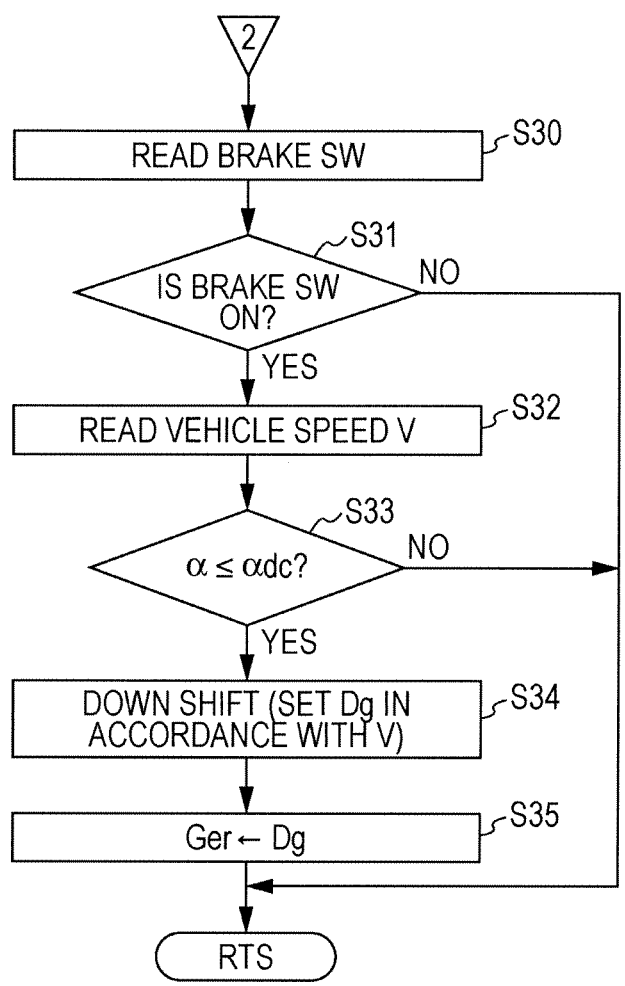
FIG. 5 is a flow chart illustrating the manual assist control sub-routine (part 2)

On the other hand, the manual assist control executed in step S14 is processed according to the manual assist control sub-routine illustrated in FIG. 4. This sub-routine is designed to assist the driver by automatically performing a gear shift operation to an optimal transmission gear stage without canceling the temporary manual shift mode the temporary manual shift mode is selected by the driver during driving, and it is determined that the driver has difficulty in operating the paddle shift switch 3.

In this sub-routine, firstly, in step S20, it is determined whether or not an acceleration flag is set. If the acceleration flag is cleared (acceleration flag=0), the flow proceeds to step S21. If the acceleration flag is set (acceleration flag=1), the process skips to step S25. An initial value of the acceleration flag is 0. The value is set in step S24, which will be described later, and cleared in step S29.

When the flow proceeds to step S21, the current vehicle speed V is compared with a set vehicle speed Vo. The set vehicle speed Vo is a lowest vehicle speed necessary for executing the manual assist control and set to 15 [Km/h] in the present embodiment. Then, if V≥Vo, it is determined that the manual assist control can be performed, and the flow proceeds to step S22. If V<Vo, it is determined that the manual assist control is unnecessary, and the routine is exited.

When the flow proceeds from step S21 to step S22, in step S22 and subsequent steps, it is determined whether or not a traveling condition is satisfied in which it is difficult to operate the paddle shift switch 3, and a deceleration request is predicted to be made. In the present embodiment, it is examined whether a sudden return of the accelerator after acceleration (steps S25 to S27) and sudden deceleration by braking (steps S30 to S33) are made to confirm the traveling condition. The process performed in steps S25 to S27 and the process performed in steps S30 to S33 correspond to a vehicle traveling state determination unit of the present invention.

Specifically, in order to determine a sudden return of the accelerator after acceleration, firstly, in step S22, the temporal differentiation is applied to the vehicle speed V to calculate an acceleration $\alpha$ ($\alpha \leftarrow d(V)/dt$). Then the flow proceeds to step S23 where the acceleration $\alpha$ is compared with an acceleration determination threshold $\alpha ac$. The acceleration determination threshold $\alpha ac$ is used for examining whether or not the vehicle is in an accelerated state and set to approximately 0.1 G to 0.2 G in the present embodiment.

Then, if $\alpha \geq \alpha ac$, it is determined that accelerated driving is performed, and the flow proceeds to step S24 where the acceleration flag is set (the acceleration flag←1). If $\alpha < \alpha ac$, it is determined that cruise driving or decelerated driving is performed, and the flow sikps to step S30.

When the flow proceeds to step S25, the accelerator opening degree $\theta acc$ is read, and in step S26, the double temporal differentiation is applied to the accelerator opening degree $\theta acc$ to calculate an accelerator pedal return acceleration $\beta$ (negative value) ($\beta \leftarrow d^2 (\theta acc)/dt^2$). In step 327, the accelerator pedal return acceleration $\beta$ is compared with the return acceleration determination threshold $\beta o$ (negative value). The return acceleration determination threshold $\beta o$ is used for examining whether or not the return of the accelerator pedal is a sudden return. In the present embodiment, an acceleration performed when the accelerator pedal which has been depressed is released is obtained in advance from an experiment or the like, and an acceleration slightly slower than the obtained acceleration is set as the return acceleration determination threshold $\beta o$.

If $\beta$ (negative value)$\leq \beta o$ (negative value), the return of the accelerator pedal is determined to be a sudden accelerator pedal return, and the flow proceeds to step S28. The transmission gear stage shifted down by one speed stage from the current target transmission gear stage Ger is set as the target transmission gear stage Per (Ger←Ger-1). Then the routine is exited. In the present embodiment, the return acceleration of the accelerator pedal is defined as a negative value. However the return acceleration of the accelerator pedal may be defined as a positive value. In this case, the determination in step S27 is made according to whether $\beta \geq \beta o$.

The TCU 1 outputs the gear shift instruction signal corresponding to the target transmission gear stage Per set in step S28 to the control valve 10a of the automatic transmission 10 and shifts down the automatic transmission 10 by one speed stage on behalf of the driver.

If the accelerator pedal is suddenly returned after accelerated driving is performed by depressing the accelerator pedal, in many cases a braking operation follows for deceleration, and then accelerated driving is performed again. For example, on a road where curves continuously appear, deceleration is performed upon entering a curve, and acceleration is performed again upon passing through the curve. Then, deceleration is performed again upon entering a next curve. On a road with a series of curves, the driver alternately depresses the accelerator pedal and the brake pedal and also continuously turns the steering wheel 2. Therefore, the driver may be too busy to operate the down-shift switch 3b in many cases.

In the present embodiment, when it is detected that the driver has difficulty in operating the down-shift switch 3b during driving in the temporary manual shift mode, and that a deceleration request is made, down-shifting is performed by one speed stage on behalf of the driver, whereby an excellent operation performance can be attained.

Subsequently, the flow proceeds from step S28 to step S29 where the acceleration flag is cleared (the acceleration flag←0), and then to step S30. In step S30 and subsequent steps, it is determined whether or not sudden acceleration by braking is executed. Firstly, in step S30, a signal from the brake switch 7 is read to examine whether or not the brake pedal is depressed. Then, when the brake switch 7 is ON, it is determined that the brake pedal is depressed, and the flow proceeds to step S32. On the other hand, when the brake pedal is not depressed while the brake switch 7 is OFF, the routine is exited.

When the flow proceeds to step S32, the vehicle speed V is read, and in step S33, the acceleration $\alpha$ obtained from the temporal differentiation of the vehicle speed V (in this case, the acceleration $\alpha$ has a negative value, and thus indicates an acceleration) is compared with sudden deceleration determination threshold $\alpha dc$ (negative value). The sudden deceleration determination threshold $\alpha dc$ is a threshold for detecting a sudden brake operation by the driver and is set approximately between -0.1 G and -0.2 G in the present embodiment.

Figure 6:
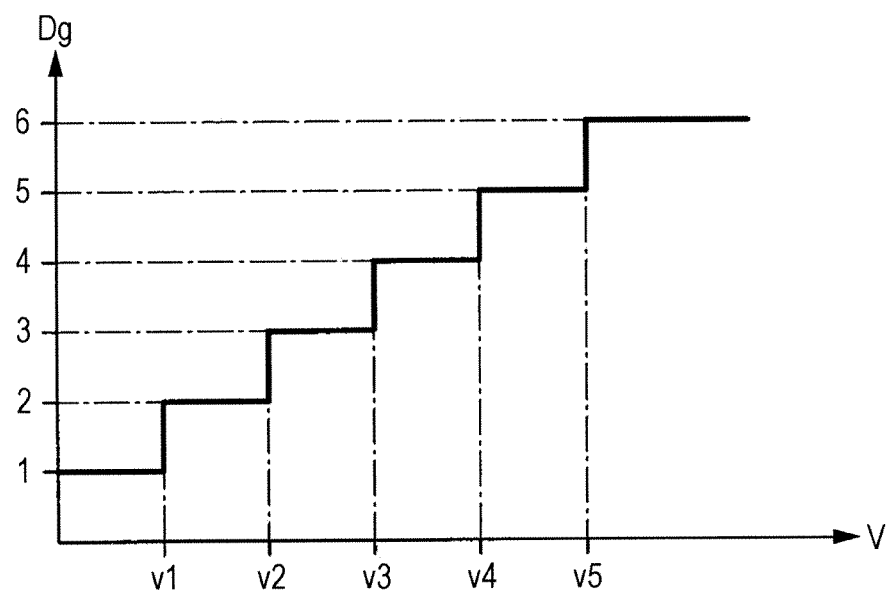
FIG. 6 is a schematic diagram of a gear shift table in which transmission gear stages set on the basis of vehicle speeds are stored.

Then, if $\alpha \leq \alpha dc$, and sudden deceleration is confirmed, the flow proceeds to step S34. On the other hand, if $\alpha > \alpha dc$, and gradual deceleration is confirmed, the routine is exited. When the flow proceeds to step S34, down-shifting is performed from the current transmission gear stage by a predetermined number of stages. The down-shifting by the predetermined number of stages is performed by referring to a down-shift table stored in the ROM on the basis of the vehicle speed V, whereby the transmission gear stage Dg after the down-shifting is set. Then, the flow proceeds to step S35. FIG. 6 illustrates a concept of the down-shift table. The down-shift table in FIG. 6 stores usable transmission gear stages according to vehicle speeds. The usable transmission gear stages are obtained in advance from an experiment or the like based on a relationship between the vehicle speed V and an optimal transmission gear stage Dg corresponding to the relevant vehicle speed V. That is, with regard to the transmission gear stages Dg of the forward six-speed transmission, the down-shift table illustrated in FIG. 6 uses for the vehicle speed V six levels of V<v1 to v5≤V, and sets an optimal transmission gear stage Dg for each level.

Then, in step 335, the transmission gear stage Dg set in step S34 is set as the target transmission gear stage Per (Ger←Dg), and the routine is exited.

As a result, according to the present embodiment, even during traveling in the temporary manual shift mode, if a sudden brake operation by the driver is detected, the transmission gear stage during the sudden brake can be shifted down to the optimal transmission gear stage based on the vehicle speed without canceling the temporary manual shift mode. Therefore, for example, if the driver brakes suddenly upon entering a sharp curve on a road where curves continuously appear, down-shifting is automatically performed without the down-shift switch 3b being operated. Accordingly, not only the engine brake can be effectively applied, but also the driver can be ready for accelerated driving upon leaving the curve, whereby excellent maneuverability can be attained.

In this manner, according to the present embodiment, if the TCU 1 confirms the down-shift requirement during driving in the temporary manual shift mode selected by the driver, assistance to the driver is made through automatically down-shifting the transmission gear stage without canceling the temporary manual shift mode, whereby the driver can be ready for accelerated driving after deceleration, and excellent operation performance can be attained.

Furthermore, when the gear shift mode is set to the temporary manual shift mode, the gear shift mode is not automatically switched to the automatic shift mode even if the driver depresses the accelerator pedal to perform accelerated driving. Thus, in the case of the traveling on the driving road where the curves continuously appear or the like, even in a driving operation where accelerated driving and decelerated driving are alternately performed, such as driving on a road with a series of curves, the driver does not need to operate the down-shift switch 3b at every time of decelerated driving, whereby it is possible to improve convenience for the driver upon performing the gear shift operation.

The present invention is not limited to the above-mentioned embodiment. For example, each of the thresholds are set to a single fixed value in the present embodiment. However, if a plurality of traveling modes having different characteristics are provided (for example, in terms of dynamic characteristics of the engine, three modes including a normal mode in which the output torque linearly changes with respect to the accelerator opening degree, a save mode for saving the engine torque, and a power mode putting much weight in power), the thresholds may have different values for each of the traveling modes. Furthermore, the lateral G detected by the lateral acceleration sensor 9 may be used for setting the thresholds. Specifically, if the lateral G is large, the thresholds may be set high to prevent a spin, whereby execute down-shifting is not practically performed. Alternatively, the longitudinal acceleration sensor 8 may be used as a tilting sensor. Specifically, a road surface gradient may be detected on the basis of a value output from the longitudinal acceleration sensor 8, and, in the case of the traveling on a downhill, a start timing for the down-shifting instruction corresponding to the target transmission gear stage Ger set in step S28 or step S35 may be set earlier based on the road surface gradient.

What is claimed is:

1. A gear shift control unit for an automatic transmission, comprising:
    an automatic shift mode in which a gear shift control is executed on the basis of a traveling state of a vehicle, the automatic shift mode being implemented by a processor;
    a temporary manual shift mode in which, when the automatic shift mode is executed, the gear shift control is temporarily executed with a manual shift operation unit in response to an operation of a driver until a predetermined cancellation condition is satisfied, and the automatic shift mode is automatically returned when the predetermined cancellation condition is satisfied; and
    a vehicle traveling state determination unit that determines a traveling state of the vehicle,
    wherein the temporary manual shift mode includes a manual assist control unit that automatically shifts down a transmission gear stage when the vehicle traveling state determination unit determines at least either one of a sudden return of an accelerator pedal from an accelerated state of the vehicle and sudden deceleration by an operation of the foot brake, on the basis of a parameter for detecting the traveling state of the vehicle.

2. The gear shift control unit for an automatic transmission according to claim 1,
    wherein the parameter for detecting the traveling state of the vehicle includes an acceleration of the vehicle and a return acceleration of the accelerator pedal, and
    wherein when the vehicle traveling state determination unit detects that the acceleration of the vehicle is larger than or equal to a set acceleration determination threshold, and, then detects that the return acceleration of the accelerator pedal is smaller than or equal to a set return acceleration determination threshold, the predetermined traveling state is confirmed, and the manual assist control unit shifts down the transmission gear stage.

3. The gear shift control unit for an automatic transmission according to claim 1,
    wherein the parameter for detecting the traveling state of the vehicle includes an operation of a foot brake and a deceleration of the vehicle, and
    wherein when the vehicle traveling state determination unit detects that a deceleration after the foot brake is depressed is smaller than or equal to a sudden deceleration determination threshold, the predetermined traveling state is confirmed, and the manual assist control unit shifts down the transmission gear stage.

* * * * *